United States Patent

Saunders et al.

(10) Patent No.: US 6,817,749 B2
(45) Date of Patent: Nov. 16, 2004

(54) ICE CREAM SOFTENING APPLIANCE

(75) Inventors: Craig M. Saunders, Rocky River, OH (US); Marc L. Vitantonio, South Russell, OH (US); Jeffrey Kalman, Cleveland Heights, OH (US); Donald C. Fuchs, Jr., Mentor, OH (US)

(73) Assignee: Nottingham-Spirk Design Associates, Inc., Cleveland, OH (US)

( * ) Notice: Subject to any disclaimer, the term of this patent is extended or adjusted under 35 U.S.C. 154(b) by 197 days.

(21) Appl. No.: 10/164,661

(22) Filed: Jun. 6, 2002

(65) Prior Publication Data

US 2003/0031083 A1 Feb. 13, 2003

Related U.S. Application Data

(60) Provisional application No. 60/349,703, filed on Jan. 22, 2002, and provisional application No. 60/310,723, filed on Aug. 7, 2001.

(51) Int. Cl.[7] .................................................. A23G 9/06
(52) U.S. Cl. .................... 366/76.7; 366/90; 366/324
(58) Field of Search ............................. 366/76.1, 76.7, 366/79, 89, 90, 324, 323

(56) References Cited

U.S. PATENT DOCUMENTS

| | | | |
|---|---|---|---|
| 970,240 A | * | 9/1910 | Kilborn .................... 366/323 |
| 2,680,879 A | * | 6/1954 | Schnuek .................... 366/90 |
| 3,164,375 A | * | 1/1965 | Frenkel .................... 366/89 |
| 3,310,837 A | * | 3/1967 | Wittrock .................... 366/76.1 |
| 3,914,956 A | | 10/1975 | Knight, Jr. |
| 4,003,521 A | | 1/1977 | Hess |
| 4,018,545 A | | 4/1977 | Knedlik |
| 4,112,545 A | | 9/1978 | Covington et al. |
| 4,114,781 A | | 9/1978 | Doyel |
| 4,358,468 A | | 11/1982 | Dolan et al. |
| 4,429,626 A | * | 2/1984 | Ihara et al. .................... 366/89 |
| 4,506,988 A | | 3/1985 | Reed |
| 4,525,073 A | * | 6/1985 | Spinner .................... 366/323 |
| 4,580,905 A | | 4/1986 | Schwitters et al. |
| 4,637,221 A | | 1/1987 | Levine |
| 4,647,214 A | | 3/1987 | Kibby |
| 4,668,561 A | | 5/1987 | Ney |
| 4,708,489 A | | 11/1987 | Carlson |
| 4,736,600 A | | 4/1988 | Brown |
| 4,793,279 A | | 12/1988 | Grenier |
| 4,796,784 A | | 1/1989 | Spirk et al. |
| 4,828,398 A | | 5/1989 | Verkler |
| 4,861,255 A | | 8/1989 | Ney |
| 5,208,050 A | | 5/1993 | Ney |
| 5,242,125 A | | 9/1993 | Rupp |
| 5,271,572 A | | 12/1993 | Grandi |
| 5,362,509 A | | 11/1994 | Martens |
| 5,375,740 A | | 12/1994 | Umetsu et al. |
| 5,385,464 A | | 1/1995 | Anderson |
| 5,706,720 A | | 1/1998 | Goch et al. |
| 5,743,640 A | | 4/1998 | Crossley |
| 5,823,675 A | | 10/1998 | Myerly |
| 6,089,747 A | | 7/2000 | Huang |

FOREIGN PATENT DOCUMENTS

| | | |
|---|---|---|
| EP | 0 917 825 A2 | 5/1999 |
| GB | 2 012 936 A | 8/1979 |
| WO | WO 98/42571 | 10/1998 |
| WO | WO 00 70962 A1 | 11/2000 |

\* cited by examiner

*Primary Examiner*—Tony G. Soohoo
(74) *Attorney, Agent, or Firm*—Fay, Sharpe, Fagan, Minnich & McKee, LLP

(57) ABSTRACT

A house appliance for making soft serve ice cream comprises a motor driven auger in a housing. The auger, which has spiral land, is contained in a work chamber having longitudinal grooves or longitudinal ribs upon which the lands ride. Recirculation and mixing of ingredients produces a smooth, soft serve product.

73 Claims, 15 Drawing Sheets

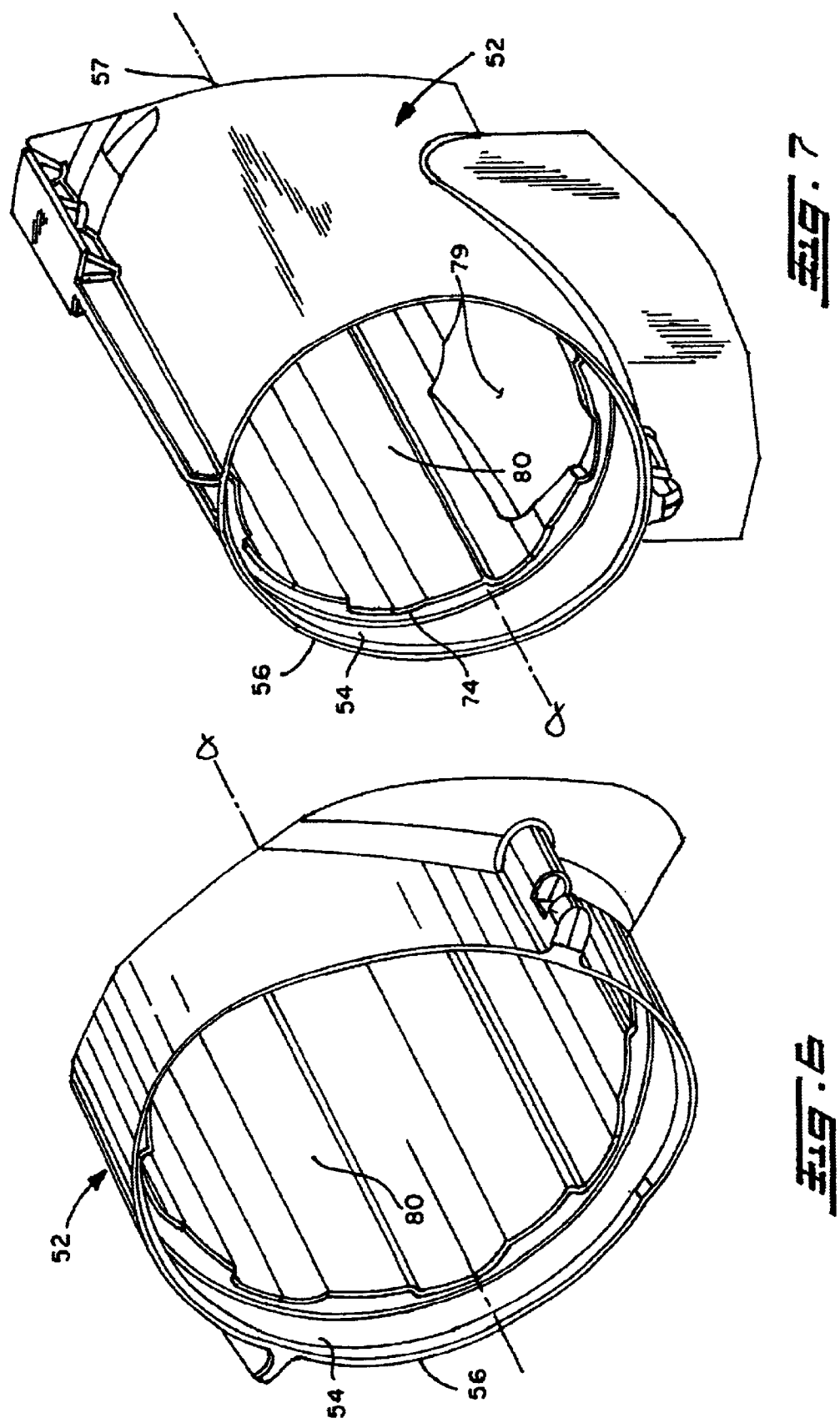

ICE CREAM SOFTENING APPLIANCE

This application claims priority of Provisional Application Ser. No. 60/349,703 filed Jan. 22, 2002, and claims priority of Provisional Application Ser. No. 60/310,723 filed Aug. 7, 2001.

The subject invention relates to the art of ice cream processing devices and, more particularly, to a processing appliance for softening ice cream for use in the home.

INCORPORATION BY REFERENCE

Reed, U.S. Pat. No. 4,506,988; Levine, U.S. Pat. No. 4,637,221; Carlson, U.S. Pat. No. 4,708,489; and Verkler, U.S. Pat. No. 4,828,398 are incorporated herein by reference as background art.

BACKGROUND OF THE INVENTION

Processing appliances for softening ice cream have been provided before now, and generally, as shown in Carlson '489 for example, have a container that is adapted to hold the ingredients that are to be processed, such as hard packed ice cream, and a rotatable auger that is fed into the container thereby displacing and working the ingredients, such as hard packed ice cream, therein to soften or otherwise blend them. Generally, the container and the auger are axially spaced from one another providing access to the opening of the container for filling it with the ingredients to be softened. Once all of the ingredients have been put into the container, the rotatable auger can be started and introduced into the container either by axial displacement of the auger or by axial displacement of the container. Such devices are typically large and generally employ complicated mechanisms to move the auger or the container axially into engagement with the other components to blend and soften the ice cream. As such, these devices are not suitable for home use.

Ice cream softening appliances for use in the home have been provided before now and generally, as shown in Verkler '398 for example, have a container for holding ice cream and other ingredients and a rotatable auger that engages the edible ingredients in the container and thereby the causes the blending and softening of them. The device in Verkler '398 includes an axially stationary auger supported on a frame and driven by a belt through the output of an electric motor. Initially, the container is axially displaced away from the auger providing access to the top of the container for the input of ingredients, such as hard packed ice cream. Once the ingredients have been put into the container, the auger started and the container is axially displaced toward the auger moving the ingredients and the auger into engagement with each other, facilitating the softening and blending of the ingredients.

In each of the foregoing devices, the auger has one or more lands that resemble large screw threads spirally extending along the axis of the auger. Before the engagement of the auger with the container, the rotating auger is fully exposed and could cause injury should an operator's hand or piece of clothing get caught by the auger. Additionally, the mechanisms employed by the foregoing devices to move the container and the auger into engagement with each other expose the operator to pinch-points and other possible causes of injury. This is a significant disadvantage of these prior devices.

In commercial applications, the danger of injury may be minimized through training and supervision of the operators of such equipment. However, in devices intended and suitable for use in the home, such as Verkler '398 for example, training and supervision are generally not possible. This is a significant disadvantage of devices intended for use in the home.

It will be appreciated that the containers in the foregoing devices include an inside surface that defines the work chamber. The product in the work chamber is displaced by the movement and rotation of the auger as it enters the work chamber. Once the auger is fully engaged with the container in the work chamber, the ingredients to be softened are sheared by the action of the auger relative to the inside surface of the work chamber. However, as the ingredients become softened and their temperature increases, the ingredients increasingly slip around the smooth inside surface of the work chamber. This reduces the efficiency of the auger by reducing the shearing action of the products between the auger and the work chamber. As such, the ingredients must be processed for an extended period to ensure that they will be sufficiently blended and that the final product will be smooth with a minimal number of hardened lumps in it.

SUMMARY OF THE INVENTION

In accordance with the present invention, a processing appliance for softening ice cream and other ingredients for use in the home is provided that avoids or minimizes the problems and difficulties encountered with the use of devices of the foregoing character, while promoting or maintaining the desired safe operation, simplicity of use, durability of construction, and economy of manufacture. More particularly in this respect, a processing appliance for softening ice cream and other ingredients for use in the home according to the invention includes a rotatable auger supported on a base that provides rotation thereto through an electric motor, a hopper for holding the ingredients, such as hard packed ice cream, a plunger assembly for urging the ingredients into engagement with the auger, and a nozzle for dispensing the softened and blended product. The hopper is supported on the base and has a processing portion that is generally coaxial with the auger. Extending transversely from the processing portion is a receiving portion. The receiving portion has an opening toward the top of it and is adapted to hold the ingredients before being processed by the auger. Adjacent the processing portion of the hopper and supported thereon coaxially with the auger is a nozzle. The nozzle has an opening at the end of it for the dispensing of the softened and blended product. The ingredients in the receiving portion of the hopper are urged toward the processing portion of the hopper and the auger by a rod and piston that is suitably adapted to travel the receiving portion.

The auger engages and is driven by the rotatable output of the base. The auger is a generally cylindrical screw with a tapered front end that has an outside profile defined by one or more lands spirally extending along the length of it. It will be appreciated that the lands have a lead defined as the axial distance traveled per revolution of the auger and that the lead of the lands may vary along the length of the auger. The cross-sectional area of the grooves of the auger may vary along the length of the auger.

The processing portion of the hopper includes an inside surface defining a processing passage. The nozzle also includes an inside surface defining a nozzle passage. The processing and nozzle passages together define a work chamber in which the auger is at least partially encapsulated, and in the preferred embodiment the auger is entirely encapsulated except for the portion exposed to the receiving portion of the hopper. Additionally, the nozzle may be adapted to force the softened and blended product to be dispensed in a downward direction out of the nozzle.

The work chamber defined by the inside surfaces of both the processing passage and the nozzle passages create an envelope that is closely fitted to the outside profile of the auger. A plurality of grooves extend longitudinally along the inside surface of both the processing passage and the nozzle passage. These grooves will provide the necessary rifling effect for displacing the ingredients forward by means of a rotating auger, and they will also create less wasteful space between the lands and grooves of the auger and the inside surface of the processing and nozzle passages. As such, a shorter auger and work chamber may be employed to provide the same blending and softening action. However, instead of grooves a plurality of ribs may extend longitudinally along the inside surface of both the processing passage and the nozzle passage. In this embodiment, the auger would ride on the ribs in the work chamber such that small pockets are formed between two adjacent ribs, the inside surface of the processing passage or the nozzle passage and the lands and grooves of the auger. These small pockets would provide significantly increased shearing action and recirculation of the ingredients being softened and blended over a work chamber that does not include such longitudinal ribs.

In operation, the ingredients to be blended and softened, such as hard packed ice cream, are placed into the hopper, the motor is energized and the plunger assembly is used to urge the ingredients into engagement with the auger. The piston of the plunger assembly is displaced through the receiving passage by pumping the handle of a ratcheting mechanism that rests atop the hopper. The lands and grooves of the auger shear the ingredients from the receiving portion of the hopper and carry them around the processing portion and along the auger into the nozzle portion filling the pockets between the ribs as the final, blended product is displaced. The action of the auger recirculates the product in and out of these pockets, increasing the shearing action of the ingredients as they travel toward the output end of the work chamber in the nozzle. A smooth, softened and blended product is extruded out of the end of the nozzle, resembling a product such as a soft serve ice cream that one gets at a commercial soft serve stand. It will be appreciated that the ingredients blended and processed by the subject device may include fillers such as cookies, fruits and/or candy. These fillers may be placed in alternate layers with the other ingredients in the receiving portion of the hopper and processed as discussed above, providing a soft serve product having the filler material broken up and blended within it.

Additionally, it will be appreciated that the subject device is intended for use with ingredients such as frozen ice cream. As such, the hopper, including both the receiving portion and the processing portion, and the nozzle may be insulated by air spaces or another suitable insulating medium to help in keeping the ingredients being processed near their freezing temperature during the entire process.

Accordingly, it is an outstanding object of the present invention to provide a processing appliance for softening ice cream for use in the home having a work chamber and auger arrangement of increased efficiency so that the size of the device may be minimized.

Another object is the provision of a processing appliance of the foregoing character in which the auger is fully encapsulated by the work chamber to minimize the possibility of injury to the operator of it.

Another object is the provision of a processing appliance of the foregoing character in which the auger and work chamber are axially stationary, eliminating the need for complicated mechanisms to move the auger and work chamber into engagement with each other.

Another object is the provision of a processing appliance of the foregoing character that is easy to operate, and simple to assemble, disassemble and clean.

A further object is the provision of a processing appliance of the foregoing character that comprises a minimal number of parts having a durable yet simple structure, thereby promoting the economic production of the appliance.

BRIEF DESCRIPTION OF THE DRAWINGS

The foregoing objects, and others, will in part be obvious and in part more fully pointed out hereinafter in conjunction with a written description of the preferred embodiments of the invention illustrated in the accompanying drawings in which:

FIG. 7 is a pictorial view showing the inside surface of the processing portion;

FIG. 8 is a pictorial view of the auger in accordance with the present invention;

DESCRIPTION OF PREFERRED EMBODIMENTS

Figure 1:
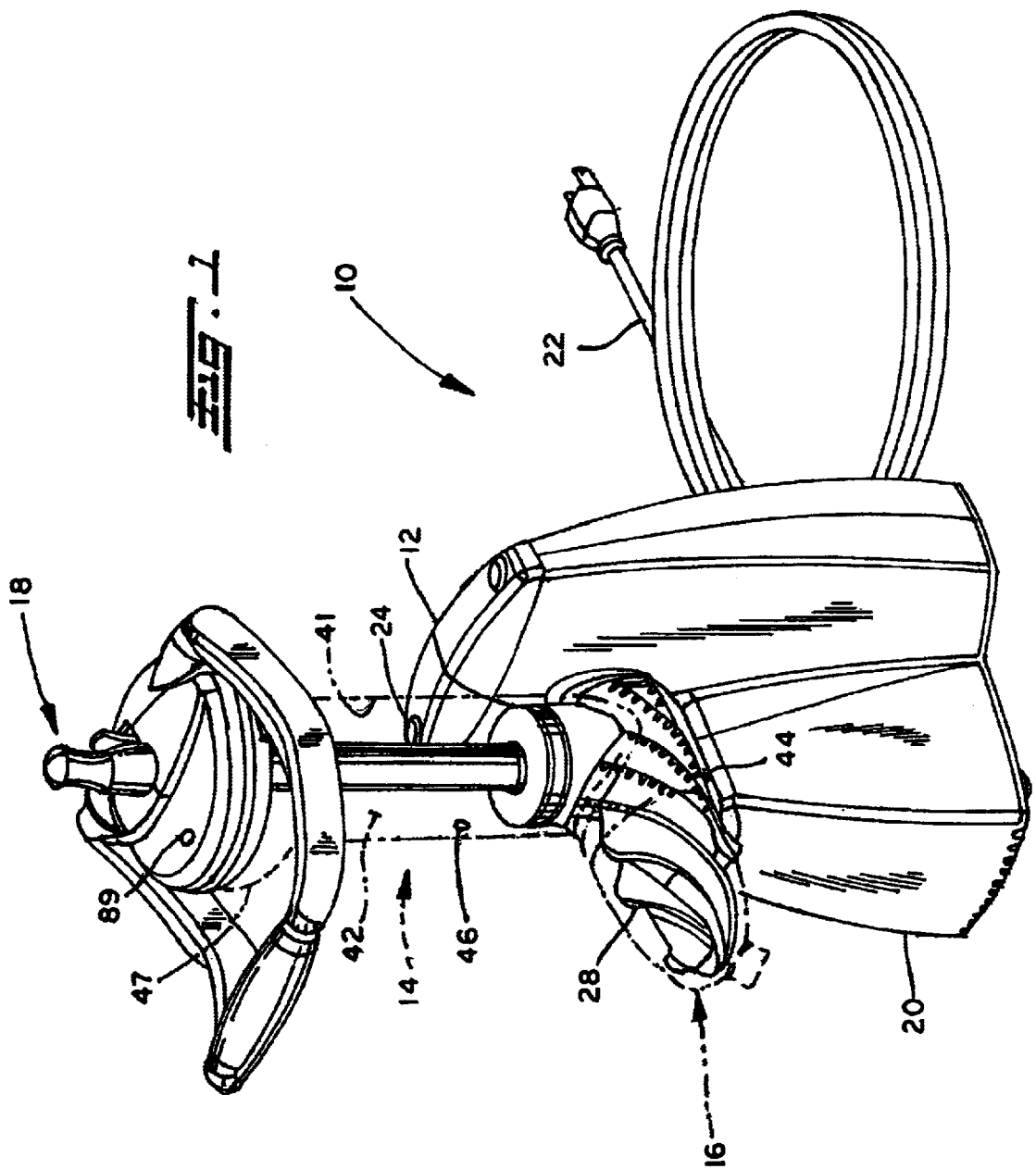
FIG. 1 is a pictorial view from the front of a fully assembled ice cream softening appliance in accordance with the present invention.
Figure 2:
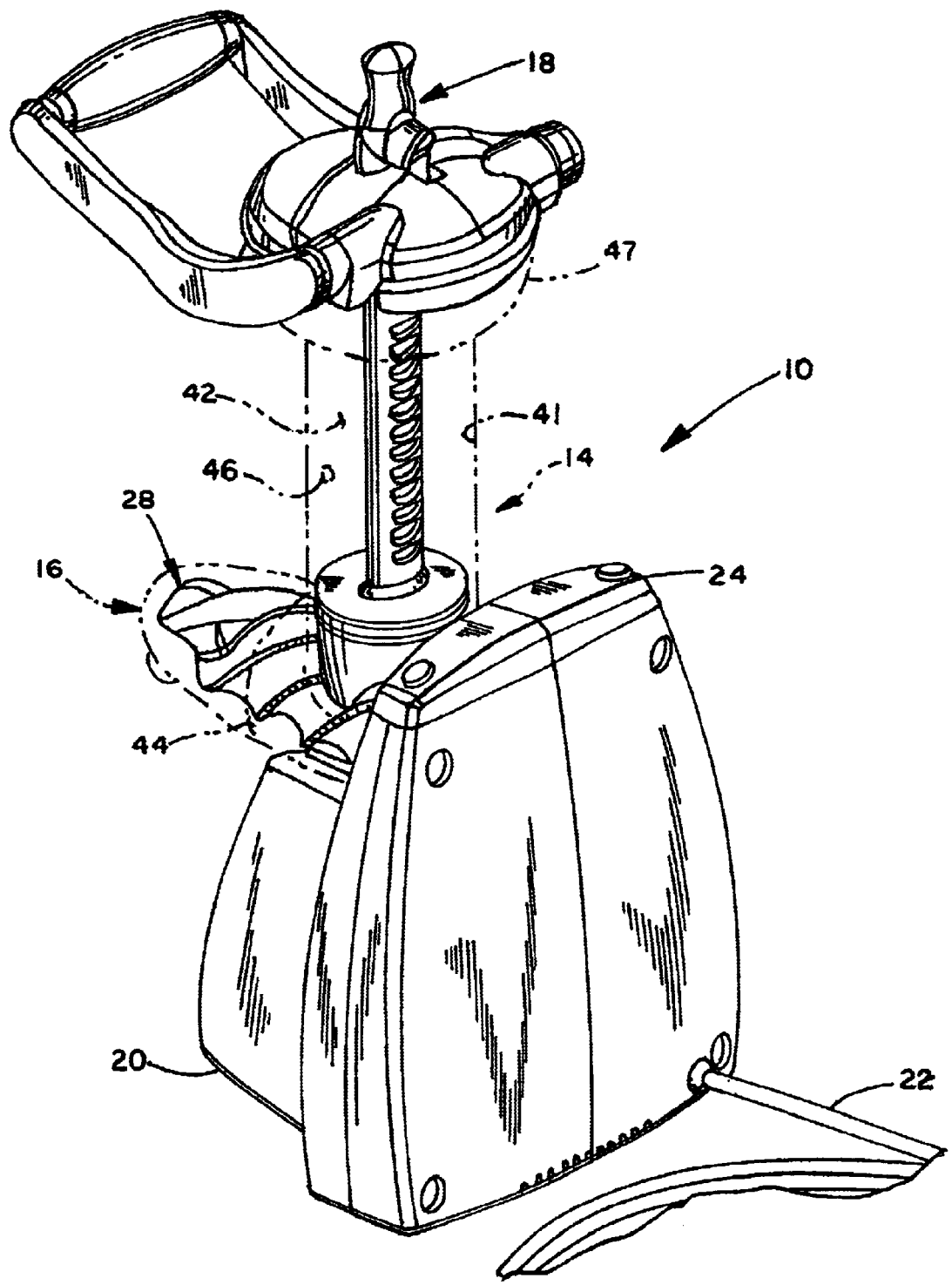
FIG. 2 is a pictorial view from the back of a fully assembled ice cream softening appliance in accordance with the present invention.
Figure 3:
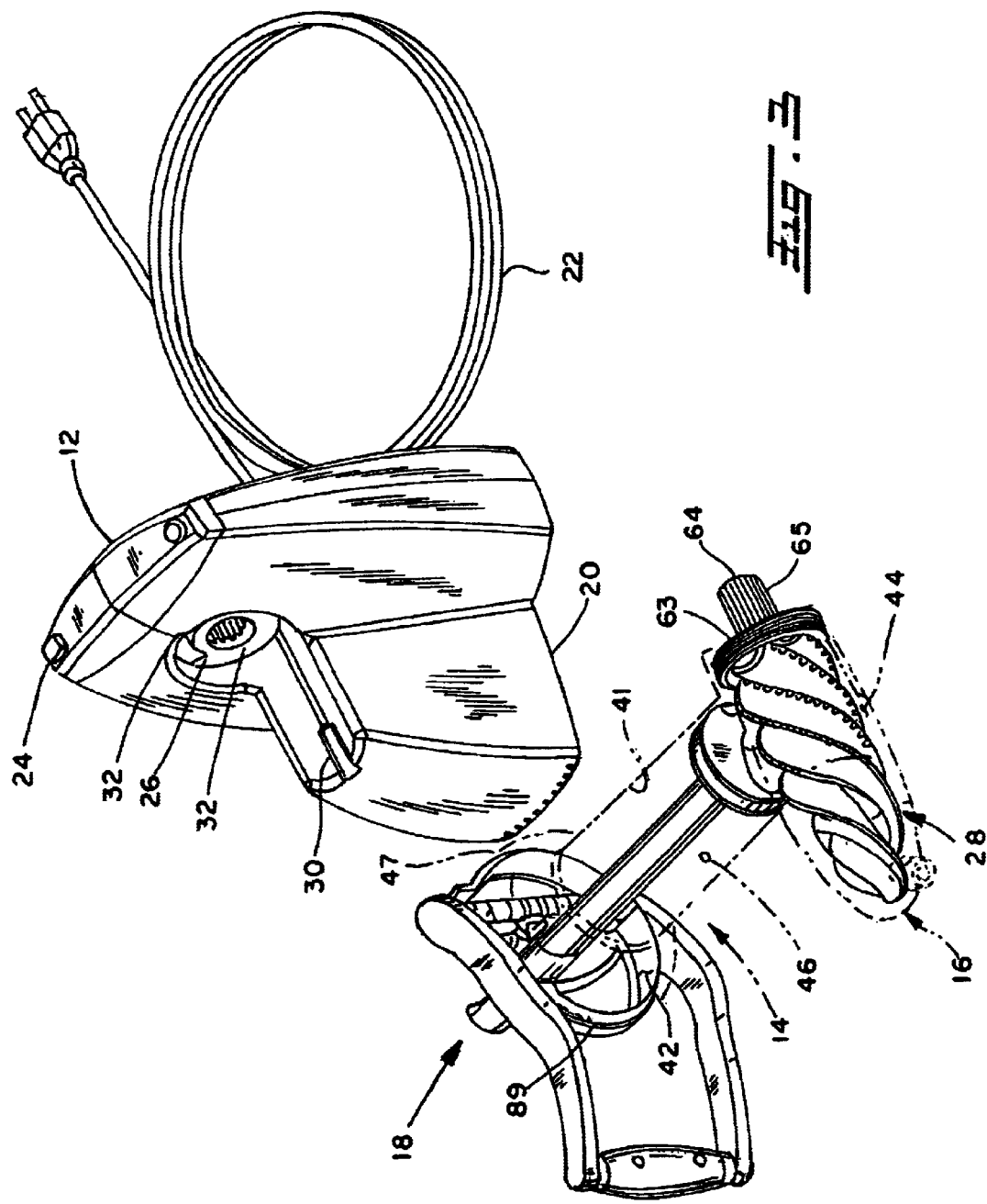
FIG. 3 is a pictorial view of the appliance in FIG. 1 shown with the ice cream processing portion disassembled from the base.

Referring now in greater detail to the drawings, in which the showings are for the purpose of illustrating preferred embodiments of the invention only, and not for the purpose of limiting the invention, FIGS. 1–3 of the drawings illustrate an ice cream processing appliance 10 having abase 12, a hopper 14, a nozzle 16, and a plunger assembly 18. A motor 20 is housed in the front of base 12 and receives electrical power from a household power outlet through a cord 22 and a switch 24. Motor 20 transmits rotational output to an output shaft 26, which extends between the front and back of base 12.

FIG. 3 illustrates ice cream processing appliance 10 showing hopper 14, nozzle 16, plunger assembly 18 and auger 28 removed as an assembly from base 12. Base 12 also includes a hopper support 30 and a hopper support connection 32.

Figure 4:
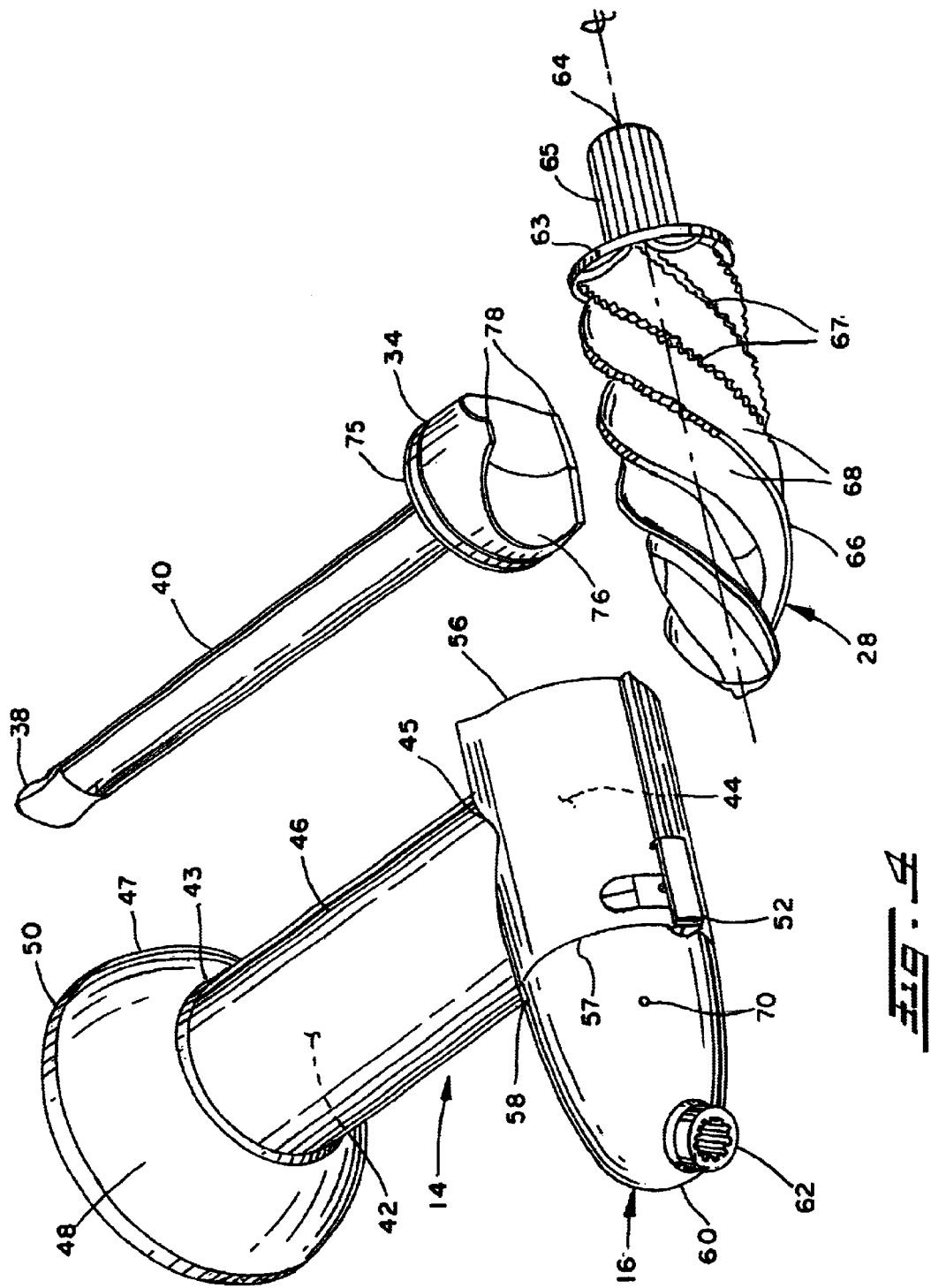
FIG. 4 is a pictorial view of the processing portion of the device in FIG. 3 shown partially disassembled.
Figure 11:
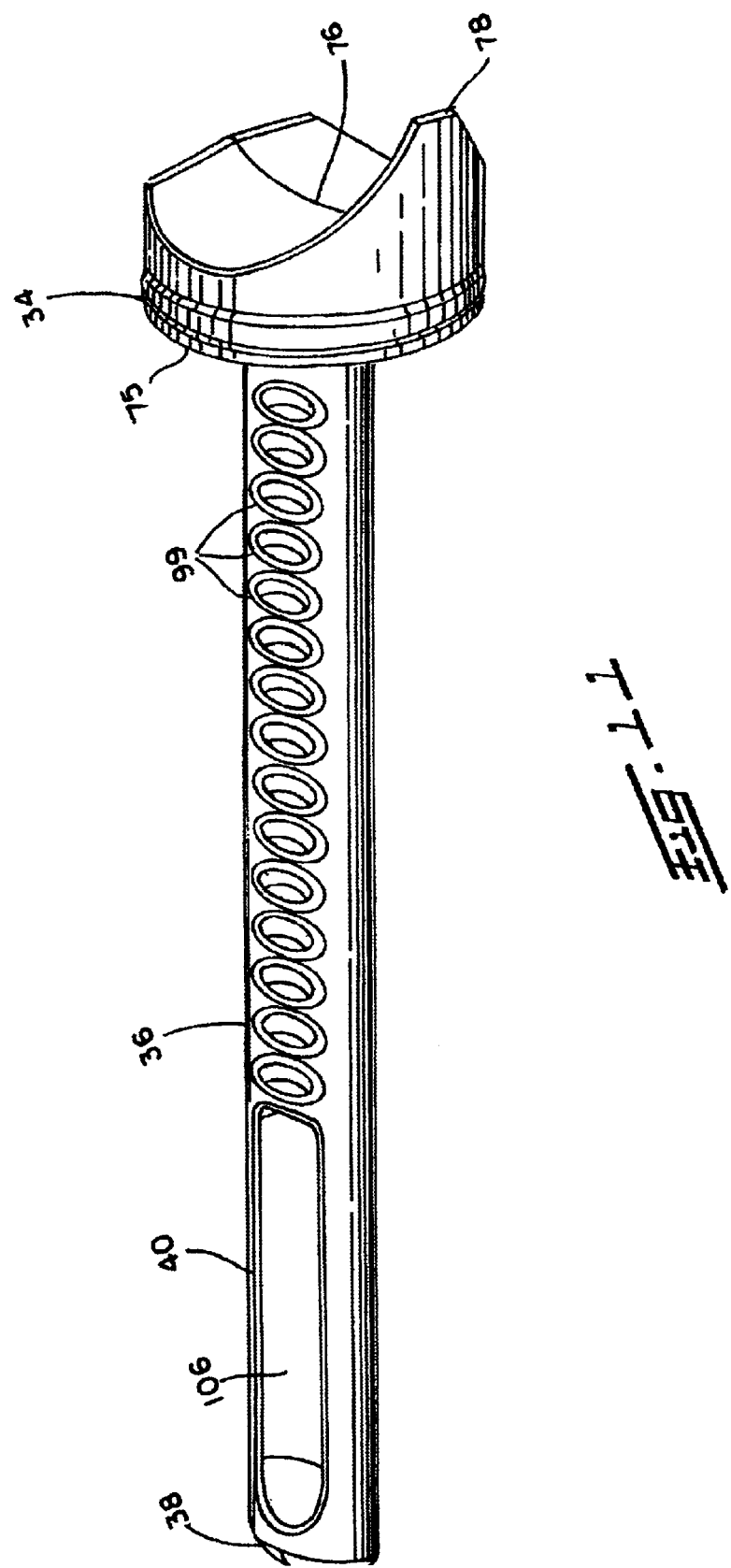
FIG. 11 is a pictorial view of part of the plunger assembly in accordance with the present invention.

In FIG. 4, a portion of plunger assembly 18 and auger 28 are shown disassembled from hopper 14 and nozzle 16. Plunger assembly 18 includes a piston 34 and a rod 36 having a knob 38 and a shaft 40. As can be seen in FIGS. 4 and 11, piston 34 includes an auger engaging surface 76 with a plurality of ribs 78.

Hopper 14 has a receiving portion 42 and a processing portion 44. As shown in FIGS. 1–4, receiving portion 42 generally comprises a cylindrical tube 46 with an inside wall 41 defining a receiving passage 48. Cylindrical tube 46 includes a first end 43 and a second end 45. However, the receiving portion may also be comprised of a flared wall 47 terminating at a receiving opening or rim 50 that inclines away from first end 43 of cylindrical tube 46 to help in funneling ingredients into receiving passage 48. Piston 34 of plunger 18 is complimentary to receiving passage 48 and tube 46 and fits loosely within tube 46 to permit travel of the piston along passage 48. In addition, at second end 45 of cylindrical tube 46 there may be a ramp, not shown, to help guide the ingredients into a process opening 79 (FIG. 7) leading to processing passage 80 and in the direction of the rotation of auger 28. Piston 34 is peripherally defined by at least one wall extending generally longitudinally with and corresponding to receiving passage 48. At least one wall of piston 34 extends between a top 75 and bottom 76 surface. The bottom surface or processing surface 76 is adapted to urge ice cream and other ingredients into engagement with auger 28. Processing surface 76 of piston 34 includes a plurality of ribs 78 extending longitudinally in the direction of auger axis a.

Figure 5:
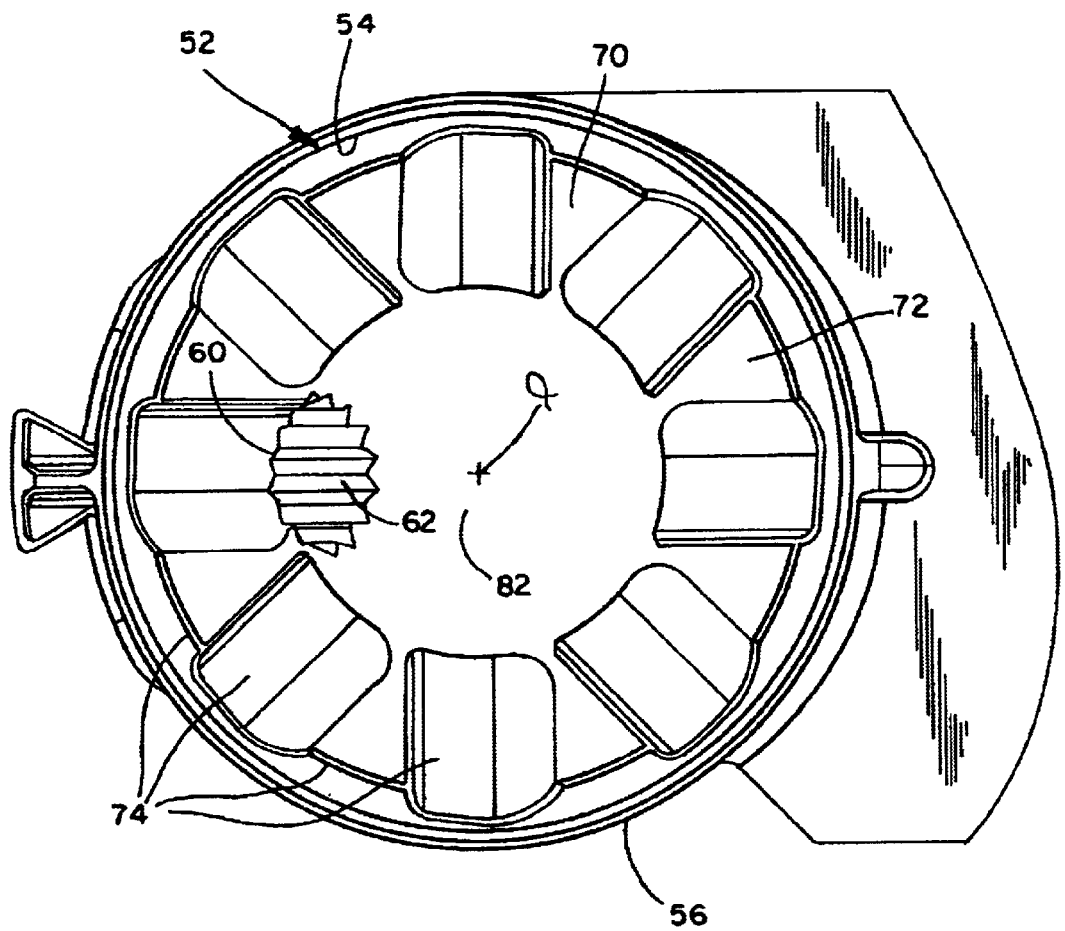
FIG. 5 is a pictorial view from the end of the hopper showing the processing and nozzle passages.
Figure 6:
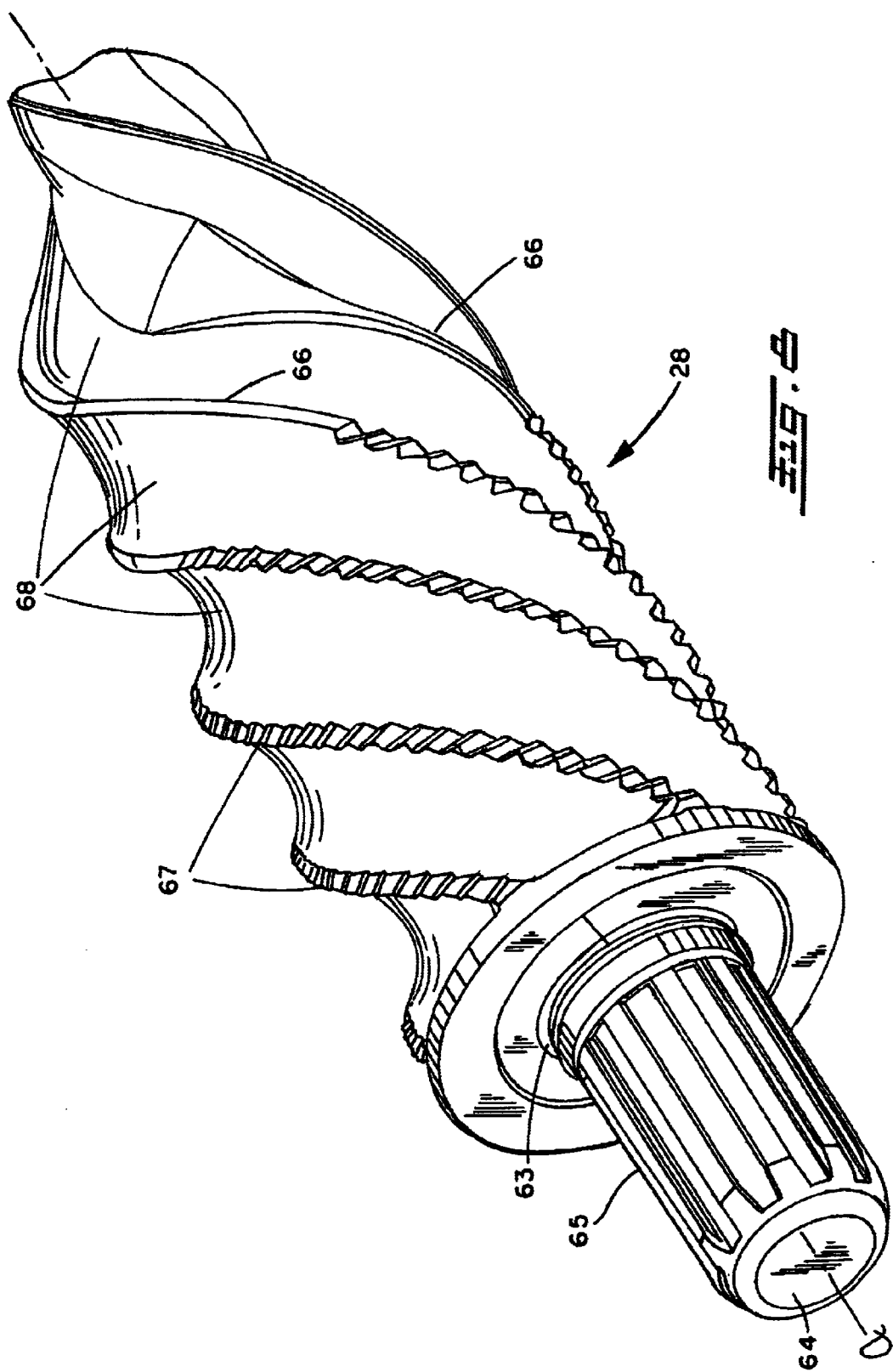
FIG. 6 is an enlarged pictorial view of the processing portion showing the grooves that extend longitudinally along the inside of the processing portion.

As shown in FIGS. 3–5, processing portion 44 of hopper 14 includes a generally circular wall 52, extending transversely to cylindrical tube 46. Wall 52 has an inside surface 54 defining a processing passage 80 about axis a, as best seen in FIGS. 6 and 7. Semicircular wall 52 extends between two end walls 56 and 57. One end wall 56 engages hopper support connection 32 of base 12 such that hopper 14 is supported thereon. The other end wall 57 engages a nozzle connector 58 at the connection end of nozzle 16 that supports nozzle 16 on hopper 14. Opposite the nozzle connector, nozzle 16 terminates at an output end or end wall 60 having an output orifice 62. Output orifice 62 is adapted, for example, by means of an elbow, to direct the product downward as it is extruded through nozzle 16. Alternatively, the output end may have an output orifice generally coaxial, not shown, with nozzle passage 82.

As best seen in FIGS. 5–7, nozzle 16 includes a wall 70, for example, a frustoconical wall, extending between nozzle connector 58 and end wall 60. Wall 70 has an inside surface 72 defining a nozzle passage 82 that extends along axis a, coaxially with processing passage 80 of hopper 14. Processing passage 80 of processing portion 44 and nozzle passage 82 of nozzle 16 define a work chamber within which auger 28 is encased. As seen in FIG. 5, a plurality of longitudinally extending grooves 74 extend along both inside surface 72 of nozzle 16 and inside surface 54 of processing portion 44 of hopper 14. Auger 28 is driven by output shaft 26 through drive shaft 64. It will be appreciated that the outside profile of auger 28, which is defined by lands 66, will loosely fit within the work chamber such that radially extending pockets will exist between the lands of the auger and the inside surfaces of both nozzle 16 and processing portion 44 of hopper 14. These pockets will extend axially along processing passage 80 and nozzle passage 82. Alternatively, extending along the inside surfaces of nozzle 16 and processing portion 44 there may be a plurality of longitudinally extending ribs, not shown, instead of grooves 74.

Figure 9:
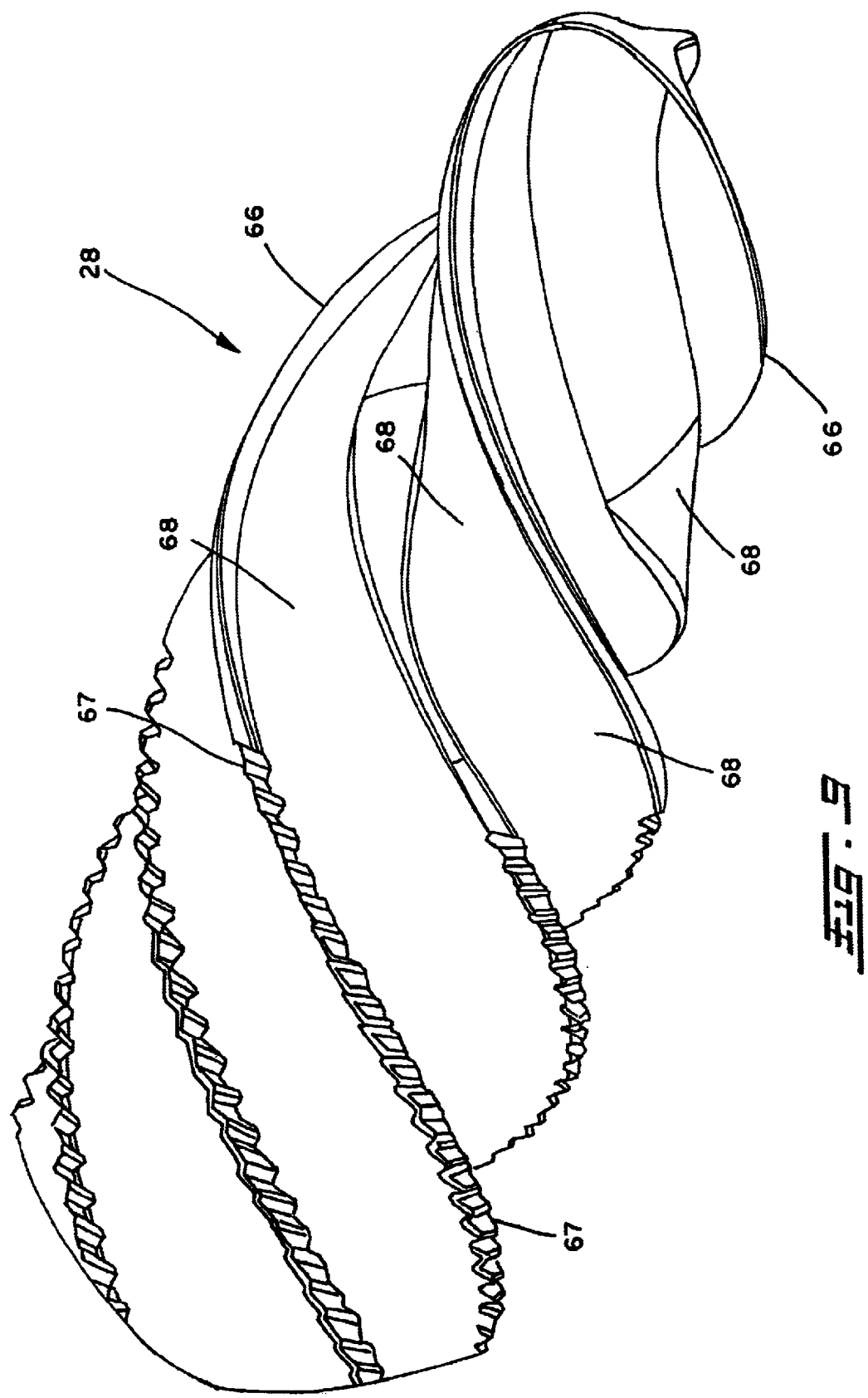
FIG. 9 is an enlarged pictorial view of part of the auger shown in FIG. 6 illustrating the variations in the lead of the auger.
Figure 10:
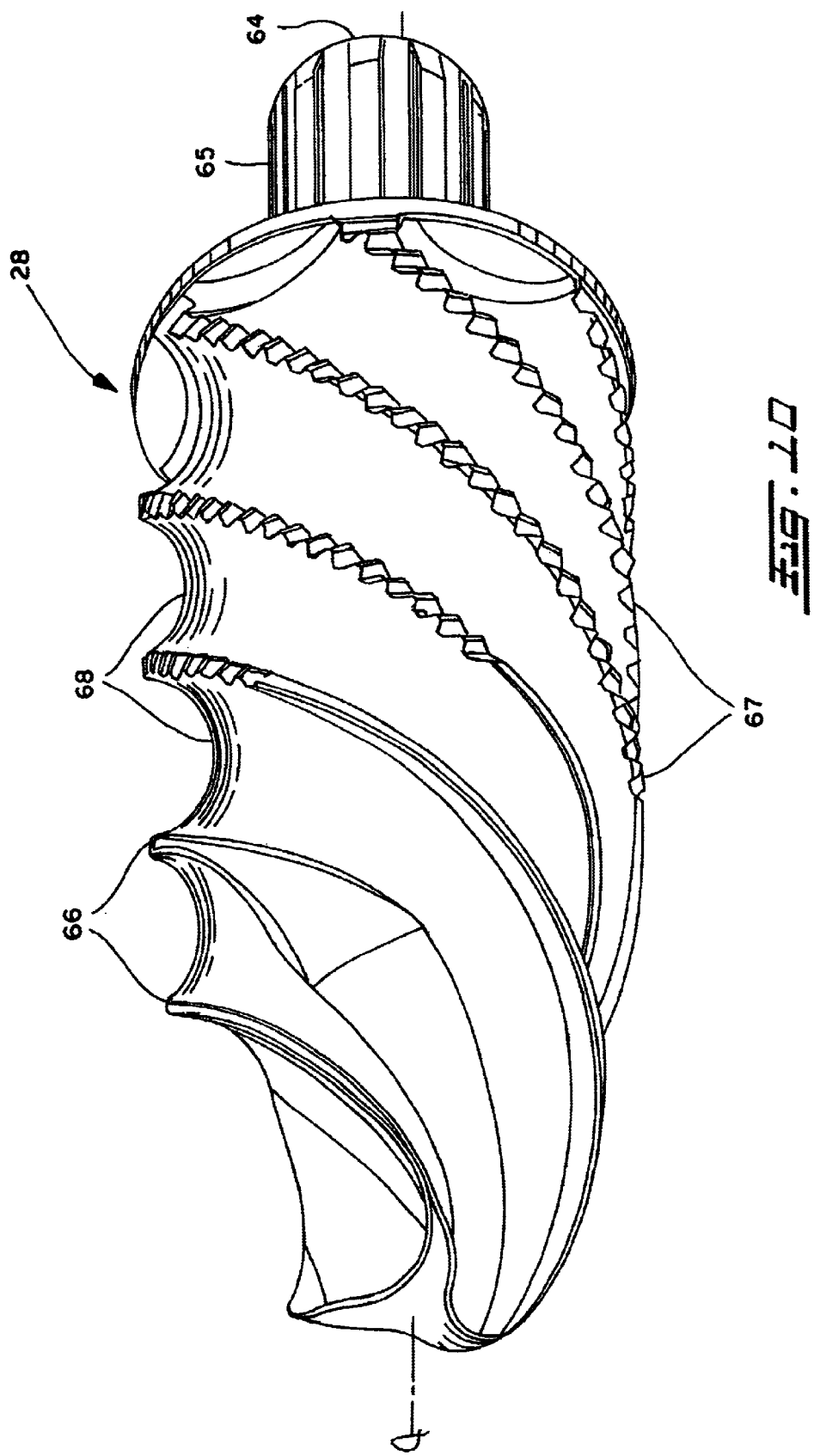
FIG. 10 is a pictorial view of part of the auger in accordance with the present invention illustrating the variations in the cross-sectional area of the grooves of the auger.

As shown in FIGS. 8–10, auger 28 has a drive shaft 64 having a connection portion 65 extending from one end 63. Connection portion 65 of drive shaft 64 engages output shaft 26, which in turn rotates auger 28. Auger 28 also includes a plurality of lands 66, each spaced apart from the other by a groove 68, as best seen in FIGS. 8–10. The auger spirally extends along axis a. Each of grooves 68 has a root radially inwardly displaced from lands 66 of auger 28. It will be appreciated that lands 66 of auger 28 have a lead defined by the axial displacement of it per revolution of the auger and that the lead of lands 66 may be variable along the length of the auger. Additionally, auger 28 may include serrations, scallops, or breaks 67 on or along lands 66. As best seen in FIG. 10, the depth and the corresponding cross-sectional area of grooves 68 of auger 28 may be variable along the length of the auger.

Figure 12:
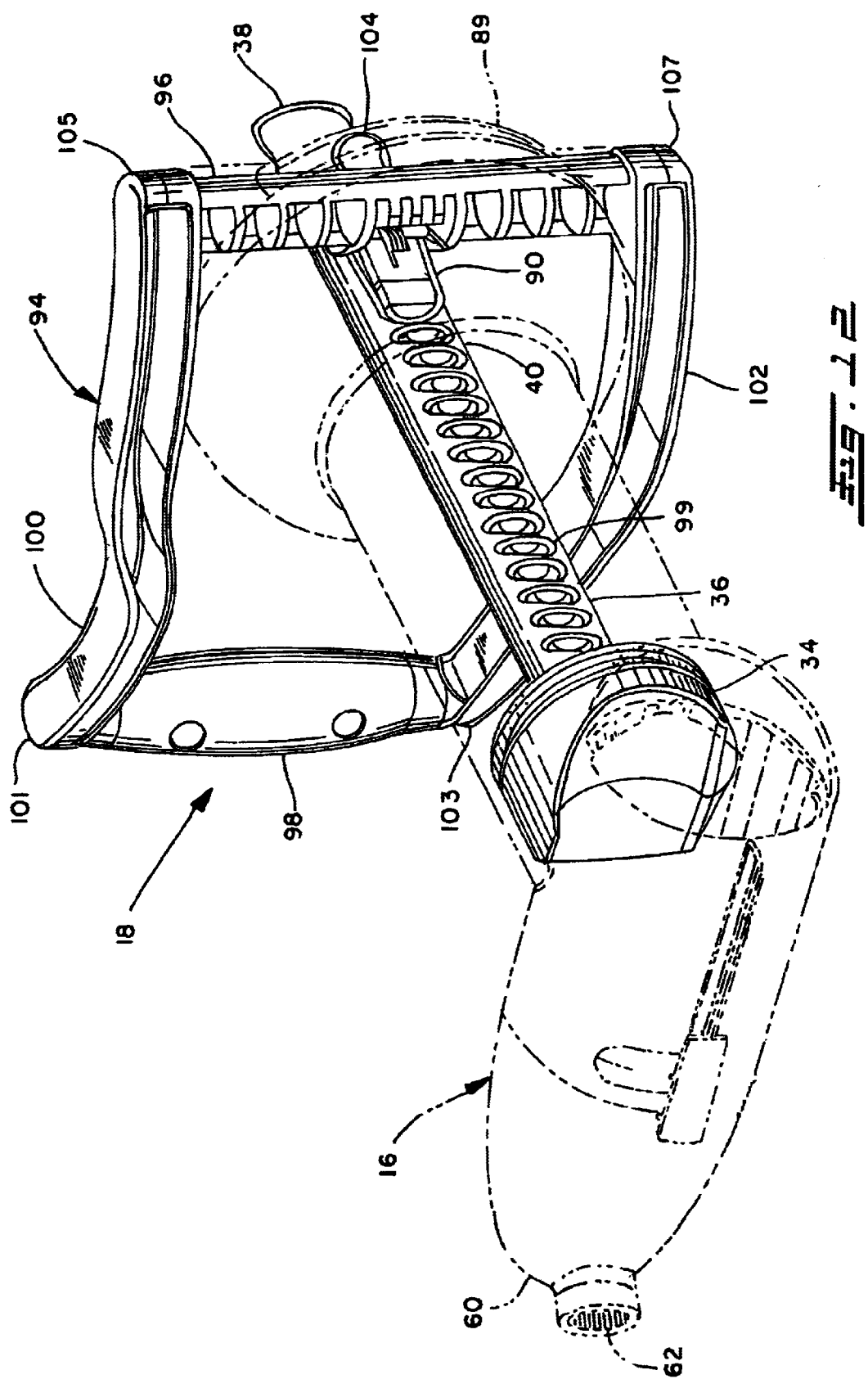
FIG. 12 is a pictorial view of the present invention showing the plunger assembly.
Figure 13:
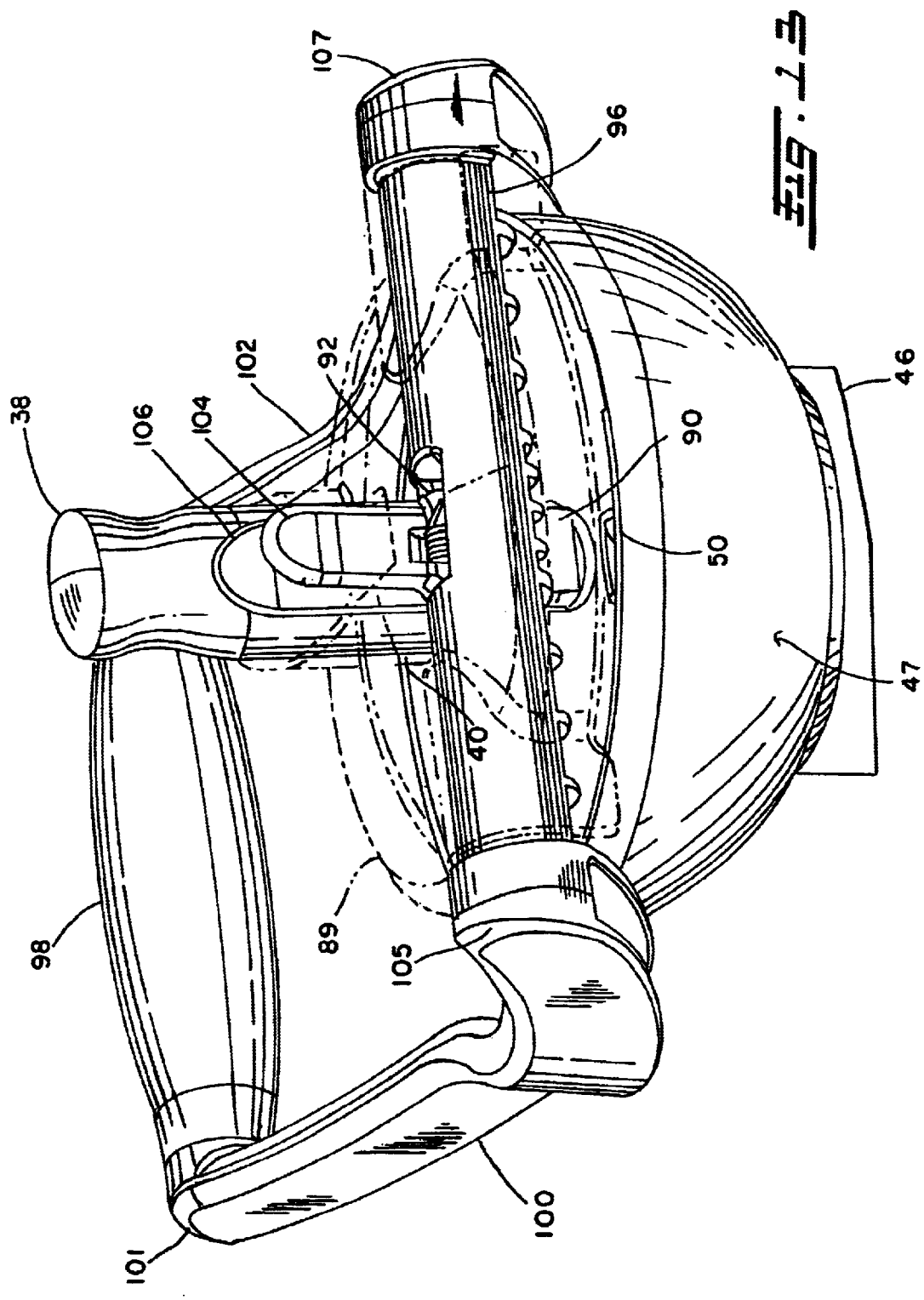
FIG. 13 is a pictorial view of part of the plunger assembly as shown in FIG. 12.

As best seen in FIGS. 11–13, plunger assembly 18 comprises piston 34, rod 36, hopper cover 89, a spring-loaded pawl 90, a pivot pin 92, a lever 94, and an axle 96. Lever 94 is generally U-shaped with a handle 98 connected to ends 101 and 103 of two legs 100 and 102, respectively. The other ends 105 and 107 of legs 100 and 102, respectively, are connected to the ends of axle 96, which is housed in hopper cover 89. Spring-loaded pawl 90 is attached to axle 96. On the back side of shaft 40 of rod 36 is a linear array of angled teeth 99 adapted to receive pawl 90. Further, pawl 90 has a clip 104 that extends vertically from pivot pin 92. There is a recess 106 on the back side of rod 36, just above teeth 99, adapted to receive clip 104. Pressing clip 104 against rod 36 and into recess 106 causes spring-loaded pawl 90 to rotate about pivot pin 92 and to disengage from teeth 99, thus permitting rod 36 and piston 34 to be pulled by knob 38 in a vertical direction. This allows the user to move plunger assembly 18 in an upward direction and out of receiving portion 42 of hopper 14 and to insert the ingredients into receiving portion 42 of hopper 14 for processing.

Figure 14:
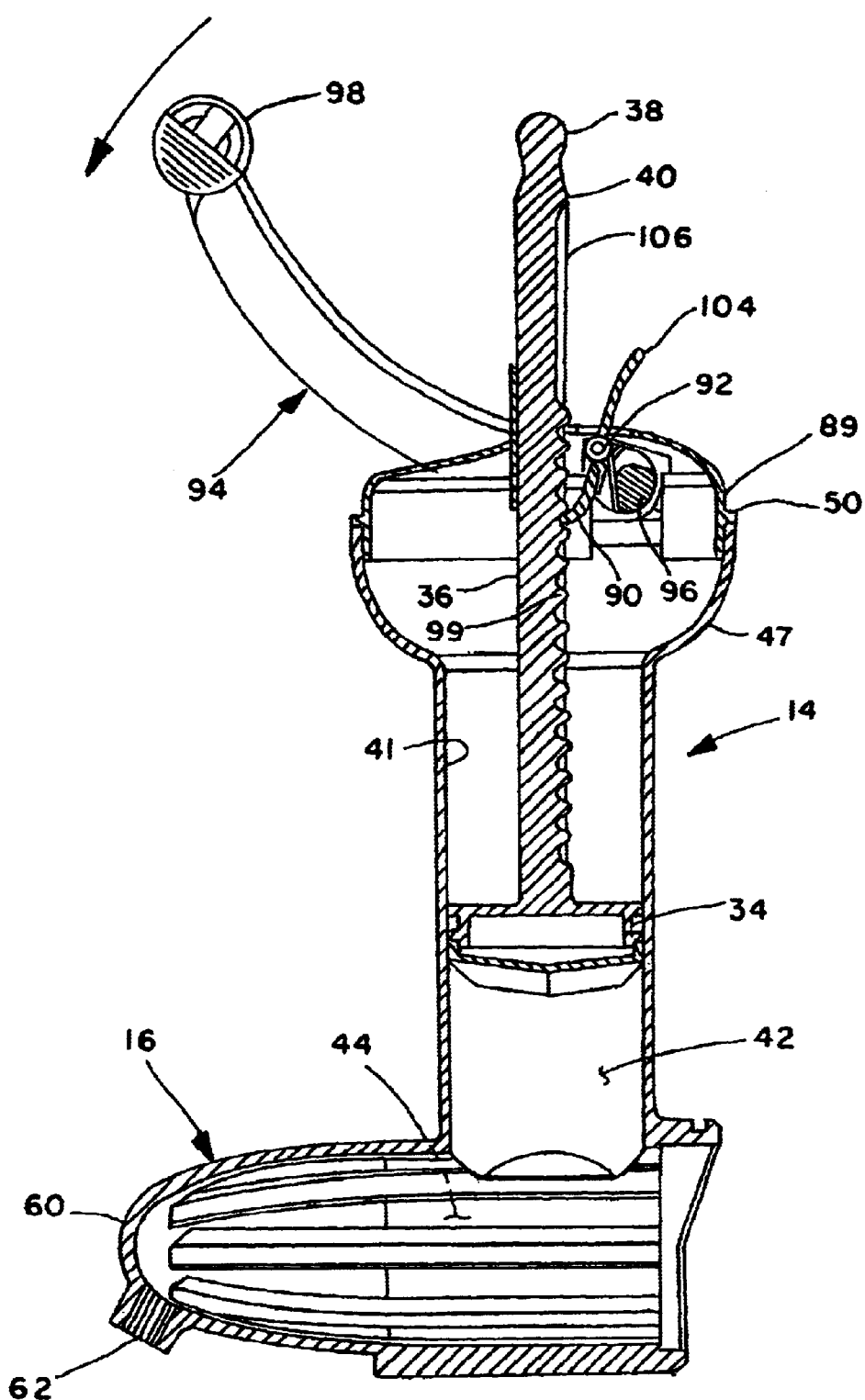
FIG. 14 is a cross-section view of the plunger assembly at the top of a stroke.
Figure 15:
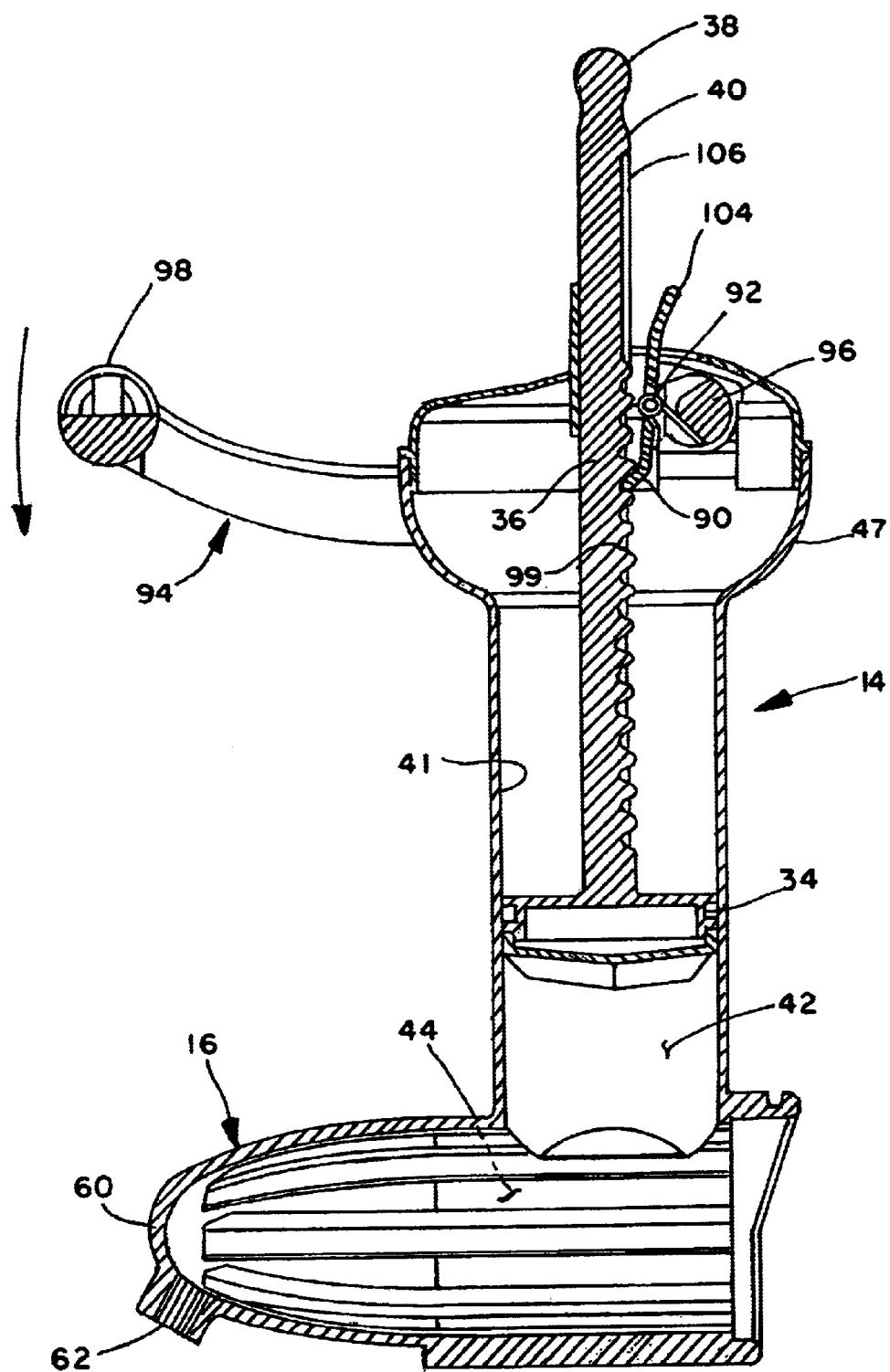
FIG. 15 is a cross-section view of the plunger assembly in the middle of a stroke; and, FIG. 16 is a cross-section view of the plunger assembly at the bottom of a stroke.
Figure 16:
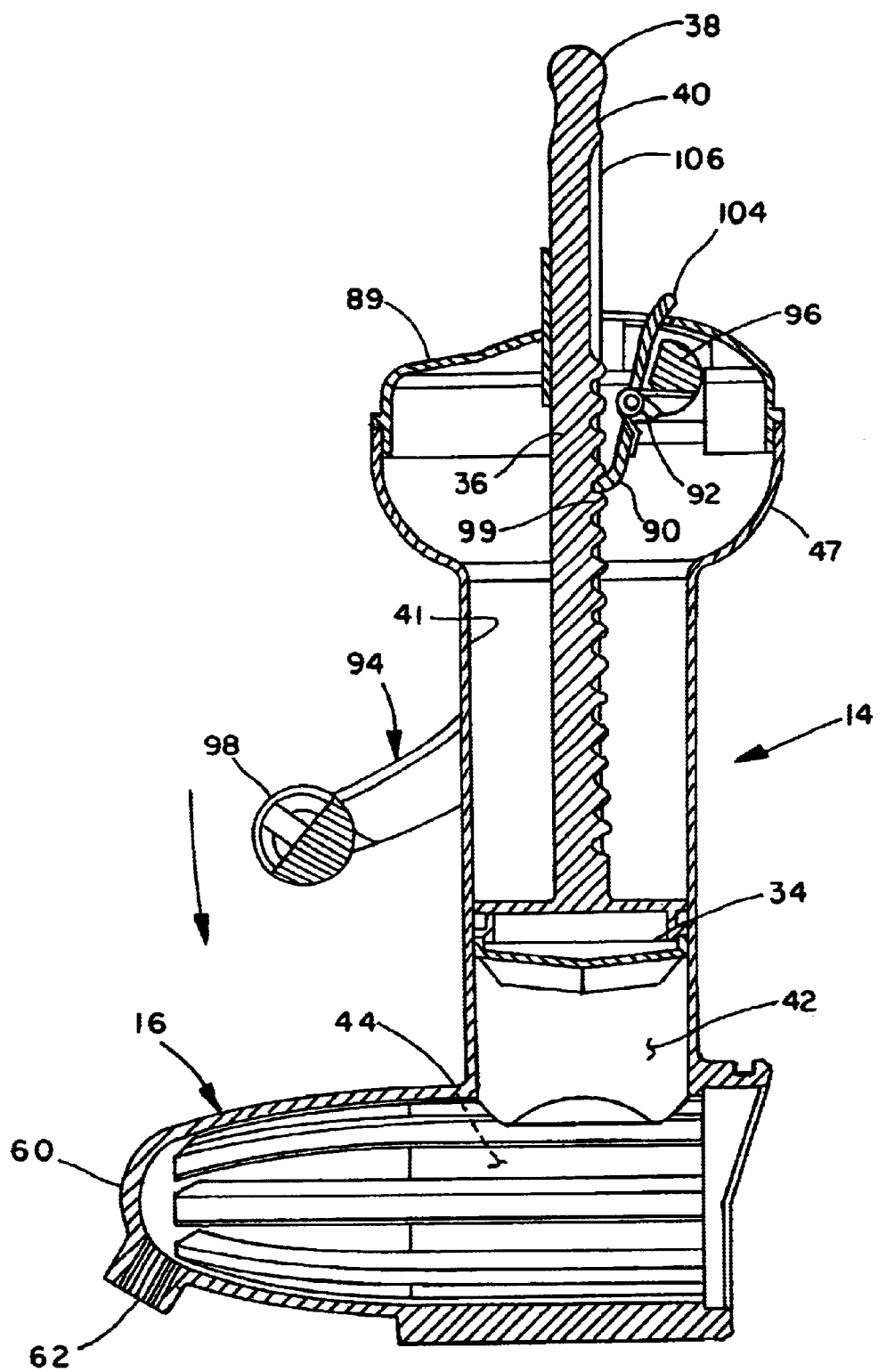

In operation, as shown in FIGS. 14–16, ingredients will be placed in receiving portion 42 of hopper 14, and plunger assembly 18 will be placed onto the hopper. Lever 94 should be in its most vertical position. As lever 94 is manually rotated in a downward direction and away from the vertical position, axle 96 rotates. With pivot pin 92 acting as a fulcrum point for pawl 90, the rotation of axle 96 causes pawl 90 to move downward until it engages with angled teeth 99. Once pawl 90 is engaged with angled teeth 99, rod 36 and piston 34 will advance downward in receiving portion 42 of hopper 14. Angled teeth 99 are adapted to allow motion in one direction only. Thus, as lever 94 is manually rotated in an upward direction and to a vertical position, pawl 90 does not engage with teeth 99 and simply moves up rod 36. During the upstroke, rod 36 and piston 34 remain stationary. Accordingly, as lever 94 is rotated in alternating clockwise and counterclockwise directions about axle 96, piston 34 is displaced from the top to the bottom of receiving portion 42. This downward displacement causes engaging surface 76 of piston 34 to engage the various ingredients in receiving portion 42 and to urge them into processing portion 44.

In another embodiment (not shown), the ingredients may be urged through the receiving portion and into the processing portion of the hopper by means of a plunger assembly having a handle, a pinion gear, a rack gear, a disengagement cam, an engagement cam, an axle, a one-way shaft clutch, a hopper cover, and a shaft. The handle is connected to both ends of the axle. The pinion gear is attached to and rotates about the axis of the axle. The rack gear is on one side of the shaft, which extends vertically through a hole in the hopper cover. A piston is attached to the bottom of the shaft. The disengagement cam has a cam surface, and the engagement cam has a cam surface. When the handle is rotated about the axle to a vertical, upwardly extending position, it comes into contact with the cam surface. This contact causes the axle to shift laterally and, in turn, causes the pinion gear to disengage from the rack gear. Thus, when the handle is in its most vertical position, the plunger assembly may be freely pulled in an upward direction and out of the receiving portion to allow for ingredients to be placed into the receiving portion for processing. When the handle is rotated about the axle and away from a vertical position, it comes into contact with the cam surface. This contact causes the axle to shift laterally and, in turn, causes the pinion gear to engage the rack gear. The pinion gear is thus able to rotate and cause the rack gear to move vertically downward. In this process, the shaft and the piston will advance downward through the receiving passage. The one-way shaft clutch acts to allow pinion gear rotation when the handle is rotated from a vertical position, while preventing pinion gear rotation when the handle is rotated to a vertical position. Accordingly, as the handle is manually rotated in alternating clockwise and counterclockwise directions about the axle, the piston is displaced from the top to the bottom of the receiving portion. This downward displacement causes the engaging surface of the piston to engage the various ingredients in the receiving portion and to urge them into the processing portion.

While considerable emphasis has been placed herein on the structures and structural interrelationships between the component parts of the embodiments disclosed, it will be appreciated that other embodiments of the invention can be made and that many changes can be made in the embodiments illustrated and described without departing from the principals of the invention. Accordingly, it is to be distinctly understood that the foregoing descriptive matter is to be interpreted as merely illustrative of the present invention and not as a limitation.

Having thus described the invention, it is so claimed:

1. A processing appliance for softening ice cream and other ingredients for use in the home, said processing appliance comprising:

a base, a hopper, a nozzle, an auger, and a plunger;

said base including a hopper support connector, an auger connector having an axis about which said auger connector rotates, and a motor driveably engaging said auger connector and providing rotational output;

said hopper having a receiving portion and a processing portion, said receiving portion including at least one wall having an inside surface defining a receiving passage, said receiving passage having a first end and a second end, said processing portion including a generally semicircular wall having an inside surface defining a processing passage having an axis and extending generally transverse said receiving passage, said processing passage extending between a pair of spaced apart end walls, one of said end walls being cooperable with said hopper support connector of said base and said hopper being supported thereon such that said auger connector and said processing passage are coaxial, the other of said end walls having a nozzle support connector, at said first end of said receiving passage said at least one wall having a receiving opening, and at said second end of said receiving passage said at least one wall defining a process opening into said processing passage;

said nozzle includes a generally frustoconical wall having an inside surface defining a nozzle passage, said nozzle passage having an axis and extending between a connection end and an output end, said connection end being cooperable with said nozzle support connector of said hopper and said nozzle being supported thereon such that said nozzle passage and said processing passage are coaxial, said output end having an output orifice generally coaxial with said nozzle passage;

said auger having an axis and being generally coaxially positioned at least partially within said processing and nozzle passages, said auger having a connection portion and a processing portion, said connection portion being adapted to driveably engage said auger connector of said base and receive rotational output from it, said processing portion having an outside profile corresponding to said processing and nozzle passages and being defined by a plurality of lands of a given lead, spirally extending along said axis of said auger, each of said plurality of lands being separated by a spirally extending groove, each of the said grooves having a root radially inwardly displaced from said lands of said auger;

said plunger having a piston portion and a handle portion; and, said piston portion being peripherally defined by at least one wall extending generally longitudinally with and corresponding to said receiving passage of said hopper, at least one wall of said piston portion extending between a top and bottom surface, said bottom surface adapted to urge said ice cream and other ingredients into engagement with said auger.

2. The processing appliance of claim 1, wherein said inside surface of said nozzle passage includes a plurality of ribs extending longitudinally along said auger axis.

3. The processing appliance of claim 1, wherein said processing surface of said piston portion of said plunger includes a plurality of ribs extending longitudinally in the direction said auger axis.

4. The processing appliance of claim 1, wherein said inside surface of said processing passage includes a plurality of ribs extending longitudinally along said auger axis.

5. The processing appliance of claim 4, wherein said inside surface of said nozzle passage includes a plurality of ribs extending longitudinally along said auger axis.

6. The processing appliance of claim 5, wherein said processing surface of said piston portion of said plunger includes a plurality of ribs extending longitudinally in the direction said auger axis.

7. The processing appliance of claim 1, wherein said lead of said plurality of lands is variable along said auger.

8. The processing appliance of claim 7, wherein said inside surface of said nozzle passage includes a plurality of ribs extending longitudinally along said auger axis.

9. The processing appliance of claim 7, wherein said processing surface of said piston portion of said plunger includes a plurality of ribs extending longitudinally in the direction said auger axis.

10. The processing appliance of claim 7, wherein said inside surface of said processing passage includes a plurality of ribs extending longitudinally along said auger axis.

11. The processing appliance of claim 10, wherein said inside surface of said nozzle passage includes a plurality of ribs extending longitudinally along said auger axis.

12. The processing appliance of claim 11, wherein said processing surface of said piston portion of said plunger includes a plurality of ribs extending longitudinally in the direction said auger axis.

13. The processing appliance of claim 3, wherein said inside surface of said nozzle passage includes a plurality of grooves extending longitudinally along said auger axis.

14. The processing appliance of claim 3, wherein said inside surface of said processing passage includes a plurality of grooves extending longitudinally along said auger axis.

15. The processing appliance of claim 14, wherein said inside surface of said nozzle passage includes a plurality of grooves extending longitudinally along said auger axis.

16. The processing appliance of claim 7, wherein said inside surface of said nozzle passage includes a plurality of grooves extending longitudinally along said auger axis.

17. The processing appliance of claim 7, wherein said inside surface of said processing passage includes a plurality of grooves extending longitudinally along said auger axis.

18. The processing appliance of claim 17, wherein said inside surface of said nozzle passage includes a plurality of grooves extending longitudinally along said auger axis.

19. The processing appliance of claim 18, wherein said processing surface of said piston portion of said plunger includes a plurality of ribs extending longitudinally in the direction said auger axis.

20. A processing appliance for softening ice cream and other ingredients adapted for use in the home, said processing appliance comprising:
   a base including an auger interface adapted to provide rotational output and a hopper support;
   a hopper supported on said base at said hopper support, said hopper including a receiving passage and a processing passage, said receiving passage terminating at and opening into said processing passage, and said processing passage being defined by an inside surface;
   a nozzle supported on said hopper and having a nozzle passage defined by an inside surface, said inside surface of said nozzle passage being generally conical and terminating at an output orifice;
   an auger driveably supported at said auger interface, said inside surfaces of said processing passage and said nozzle passage forming a work chamber, said auger being at least partially encapsulated within said work chamber, and said auger having an outside profile cooperable with said inside surfaces forming said chamber; and,
   a plunger having a handle portion and a piston portion extending from said handle portion, said piston portion being cooperable with said receiving passage of said hopper and having a processing surface adapted to urge said ice cream and other ingredients into engagement with said auger.

21. The processing appliance of claim 20, wherein said inside surface of said nozzle passage includes a plurality of longitudinally extending ribs.

22. The processing appliance of claim 20, wherein said processing surface of said piston portion of said plunger includes a plurality of longitudinally extending ribs.

23. The processing appliance of claim 20, wherein said inside surface of said processing passage of said hopper includes a plurality of longitudinally extending ribs.

24. The processing appliance of claim 23, wherein said inside surface of said nozzle passage includes a plurality of longitudinally extending ribs.

25. The processing appliance of claim 24, wherein said processing surface of said piston portion of said plunger includes a plurality of longitudinally extending ribs.

26. The processing appliance of claim 20, wherein said auger has a length and includes a plurality of lands having a lead, said lead varying along said length of said auger.

27. The processing appliance of claim 26, wherein said inside surface of said nozzle passage includes a plurality of longitudinally extending ribs.

28. The processing appliance of claim 26, wherein said processing surface of said piston portion of said plunger includes a plurality of longitudinally extending ribs.

29. The processing appliance of claim 26, wherein said inside surface of said processing passage of said hopper includes a plurality of longitudinally extending ribs.

30. The processing appliance of claim 29, wherein said inside surface of said nozzle passage includes a plurality of longitudinally extending ribs.

31. The processing appliance of claim 30, wherein said processing surface of said piston portion of said plunger includes a plurality of longitudinally extending ribs.

32. A work chamber for a processing appliance for softening ice cream and other ingredients adapted for use in the home, said work chamber comprising:
   a hopper having a receiving portion and a processing portion, said receiving portion including at least one wall having an inside surface defining a receiving passage, said receiving passage extending between a first and a second end, said processing portion including at least one wall having an inside surface defining a processing passage having an axis and extending generally transverse said receiving passage, at said first end of said receiving passage said at least one wall forming a receiving opening providing access to said receiving passage, at said second end of said receiving passage said at least one wall being support on said at least one wall of said processing portion and forming an opening between said receiving and processing passages, said at least one wall of said processing portion terminating at a pair of spaced apart end walls;
   a nozzle including at least one frustoconical wall having an inside surface defining a nozzle passage having an axis, said frustoconical wall extending between a first end and a second end, at said first end said frustoconical wall terminates at an end wall cooperable with one of said end walls of said processing passage such that said nozzle is coaxially supported on said hopper adjacent one of said end walls, said second end including a nozzle orifice in fluid communication with said nozzle passage; and,
   a rotatable auger generally coaxially positioned at least partially within said processing and nozzle passages, said auger including a plurality of spirally, axially extending lands having a lead, said lands defining an outside profile of said auger, and said outside profile being cooperable with said inside surface of said processing passage and said nozzle passage.

33. The work chamber of claim 32, wherein said lead of said auger is variable along said auger axis.

34. The work chamber of claim 32, wherein said inside surface of said processing passage and nozzle passage each includes a plurality of longitudinally extending ribs.

35. The work chamber of claim 34, wherein said lead of said auger is variable along said auger axis.

36. A processing appliance for softening ice cream and other ingredients for use in the home, said processing appliance comprising:

a base, a hopper, a nozzle, an auger, and a plunger assembly; said base including a hopper support connector, an auger connector having an axis about which said auger connector rotates, and a motor driveably engaging said auger connector and providing rotational output;

said hopper having a receiving portion and a processing portion, said receiving portion including at least one wall having an inside surface defining a receiving passage, said receiving passage having a first end and a second end, said processing portion including a generally semicircular wall having an inside surface defining a processing passage having an axis and extending generally transverse said receiving passage, said processing passage extending between a pair of spaced apart end walls, one of said end walls being cooperable with said hopper support connector of said base and said hopper being supported thereon such that said auger connector and said processing passage are coaxial, the other of said end walls having a nozzle support connector, at said first end of said receiving passage said at least one wall having a fill opening, and at said second end of said receiving passage said at least one wall defining a process opening into said processing passage;

said nozzle includes a generally frustoconical wall having an inside surface defining a nozzle passage, said nozzle passage having an axis and extending between a connection end and an output end, said connection end being cooperable with said nozzle support connector of said hopper and said nozzle being supported thereon such that said nozzle passage and said processing passage are coaxial, said output end having an output orifice generally coaxial with said nozzle passage, said output orifice having an elbow connected to it;

said auger having an axis and being generally coaxially positioned at least partially within said processing and nozzle passages, said auger having a connection portion and a processing portion, said connection portion being adapted to driveably engage said auger connector of said base and receive rotational output, said processing portion having an outside profile corresponding to said processing and nozzle passages and being defined by a plurality of lands of a given lead, spirally extending along said axis of said auger, each of said plurality of lands being separated by a spirally extending groove, each of said grooves having a root radially inwardly displaced from said lands of said auger; and, said plunger assembly having a shaft portion, a piston portion, an axle, a handle adapted to rotate about said axle, a pinion gear, a rack gear adapted to engage said pinion gear, a hopper cover through which extends said shaft portion and said rack gear, a disengagement cam adapted to disengage said pinion gear from said rack gear, an engagement cam adapted to engage said pinion gear to said rack gear, and a one-way shaft clutch adapted to allow rotation of said pinion gear in one direction only, said piston portion being peripherally defined by at least one wall extending generally longitudinally with and corresponding to said receiving passage of said hopper and at least one wall of said piston portion extending between a top and a bottom surface, said bottom surface adapted to urge said ice cream and other ingredients into engagement with said auger.

37. The processing appliance of claim 36, wherein said inside surface of said nozzle passage includes a plurality of ribs extending longitudinally along said auger axis.

38. The processing appliance of claim 36, wherein said processing surface of said piston portion of said plunger assembly includes a plurality of ribs extending longitudinally in the direction said auger axis.

39. The processing appliance of claim 36, wherein said inside surface of said processing passage includes a plurality of ribs extending longitudinally along said auger axis.

40. The processing appliance of claim 39, wherein said inside surface of said nozzle passage includes a plurality of ribs extending longitudinally along said auger axis.

41. The processing appliance of claim 40, wherein said processing surface of said piston portion of said plunger assembly includes a plurality of ribs extending longitudinally in the direction said auger axis.

42. The processing appliance of claim 36, wherein said lead of said plurality of lands is variable along said auger.

43. The processing appliance of claim 42, wherein said inside surface of said nozzle passage includes a plurality of ribs extending longitudinally along said auger axis.

44. The processing appliance of claim 42, wherein said processing surface of said piston portion of said plunger assembly includes a plurality of ribs extending longitudinally in the direction said auger axis.

45. The processing appliance of claim 42, wherein said inside surface of said processing passage includes a plurality of ribs extending longitudinally along said auger axis.

46. The processing appliance of claim 45, wherein said inside surface of said nozzle passage includes a plurality of ribs extending longitudinally along said auger axis.

47. The processing appliance of claim 46, wherein said processing surface of said piston portion of said plunger assembly includes a plurality of ribs extending longitudinally in the direction said auger axis.

48. The processing appliance of claim 38, wherein said inside surface of said nozzle passage includes a plurality of grooves extending longitudinally along said auger axis.

49. The processing appliance of claim 48, wherein said inside surface of said processing passage includes a plurality of grooves extending longitudinally along said auger axis.

50. The processing appliance of claim 49, wherein said inside surface of said nozzle passage includes a plurality of grooves extending longitudinally along said auger axis.

51. The processing appliance of claim 42, wherein said inside surface of said nozzle passage includes a plurality of grooves extending longitudinally along said auger axis.

52. The processing appliance of claim 42, wherein said inside surface of said processing passage includes a plurality of grooves extending longitudinally along said auger axis.

53. The processing appliance of claim 52, wherein said inside surface of said nozzle passage includes a plurality of grooves extending longitudinally along said auger axis.

54. The processing appliance of claim 53, wherein said processing surface of said piston portion of said plunger assembly includes a plurality of ribs extending longitudinally in the direction said auger axis.

55. A processing appliance for softening ice cream and other ingredients for use in the home, said processing appliance comprising:

a base, a hopper, a nozzle, an auger, and a plunger assembly;

said base including a hopper support connector, an auger connector having an axis about which said auger connector rotates, and a motor driveably engaging said auger connector and providing rotational output;

said hopper having a receiving portion and a processing portion, said receiving portion including at least one wall having an inside surface defining a receiving passage, said receiving passage having a first end and a second end, said processing portion including a generally semicircular wall having an inside surface defining a processing passage having an axis and extending generally transverse said receiving passage, said processing passage extending between a pair of spaced apart end walls, one of said end walls being cooperable with said hopper support connector of said base and said hopper being supported thereon such that said auger connector and said processing passage are coaxial, the other of said end walls having a nozzle support connector, at said first end of said receiving passage said at least one wall having a fill opening, and at said second end of said receiving passage said at least one wall defining a process opening into said processing passage;

said nozzle includes a generally frustoconical wall having an inside surface defining a nozzle passage, said nozzle passage having an axis and extending between a connection end and an output end, said connection end being cooperable with said nozzle support connector of said hopper and said nozzle being supported thereon such that said nozzle passage and said processing passage are coaxial, said output end having an output orifice;

said auger having an axis and being generally coaxially positioned at least partially within said processing and nozzle passages, said auger having a connection portion and a processing portion, said connection portion being adapted to driveably engage said auger connector of said base and receive rotational output, said processing portion having an outside profile corresponding to said processing and nozzle passages and being defined by a plurality of lands of a given lead, spirally extending along said axis of said auger, each of said plurality of lands being separated by a spirally extending groove, each of said grooves having a root radially inwardly displaced from said lands of said auger; and, said plunger assembly having a piston, a rod, a hopper cover, a linear array of teeth on said rod, an axle, a lever adapted to rotate about said axle, a spring-loaded pawl adapted to engage said linear teeth, a hopper cover through which extends said rod, a clip adapted to disengage said pawl from said teeth, said piston portion being peripherally defined by at least one wall extending generally longitudinally with and corresponding to said receiving passage of said hopper and at least one wall of said piston portion extending between a top and a bottom surface, said bottom surface adapted to urge said ice cream and other ingredients into engagement with said auger.

56. The processing appliance of claim 55, wherein said inside surface of said nozzle passage includes a plurality of ribs extending longitudinally along said auger axis.

57. The processing appliance of claim 55, wherein said processing surface of said piston portion of said plunger assembly includes a plurality of ribs extending longitudinally in the direction said auger axis.

58. The processing appliance of claim 55, wherein said inside surface of said processing passage includes a plurality of ribs extending longitudinally along said auger axis.

59. The processing appliance of claim 58, wherein said inside surface of said nozzle passage includes a plurality of ribs extending longitudinally along said auger axis.

60. The processing appliance of claim 59, wherein said processing surface of said piston portion of said plunger assembly includes a plurality of ribs extending longitudinally in the direction said auger axis.

61. The processing appliance of claim 55, wherein said lead of said plurality of lands is variable along said auger.

62. The processing appliance of claim 61, wherein said inside surface of said nozzle passage includes a plurality of ribs extending longitudinally along said auger axis.

63. The processing appliance of claim 61, wherein said processing surface of said piston portion of said plunger assembly includes a plurality of ribs extending longitudinally in the direction said auger axis.

64. The processing appliance of claim 61, wherein said inside surface of said processing passage includes a plurality of ribs extending longitudinally along said auger axis.

65. The processing appliance of claim 64, wherein said inside surface of said nozzle passage includes a plurality of ribs extending longitudinally along said auger axis.

66. The processing appliance of claim 65, wherein said processing surface of said piston portion of said plunger assembly includes a plurality of ribs extending longitudinally in the direction said auger axis.

67. The processing appliance of claim 57, wherein said inside surface of said nozzle passage includes a plurality of grooves extending longitudinally along said auger axis.

68. The processing appliance of claim 67, wherein said inside surface of said processing passage includes a plurality of grooves extending longitudinally along said auger axis.

69. The processing appliance of claim 68, wherein said inside surface of said nozzle passage includes a plurality of grooves extending longitudinally along said auger axis.

70. The processing appliance of claim 61, wherein said inside surface of said nozzle passage includes a plurality of grooves extending longitudinally along said auger axis.

71. The processing appliance of claim 61, wherein said inside surface of said processing passage includes a plurality of grooves extending longitudinally along said auger axis.

72. The processing appliance of claim 71, wherein said inside surface of said nozzle passage includes a plurality of grooves extending longitudinally along said auger axis.

73. The processing appliance of claim 72, wherein said processing surface of said piston portion of said plunger assembly includes a plurality of ribs extending longitudinally in the direction said auger axis.

* * * * *